United States Patent
Lais et al.

(10) Patent No.: US 8,407,389 B2
(45) Date of Patent: *Mar. 26, 2013

(54) ATOMIC OPERATIONS WITH PAGE MIGRATION IN PCIE

(75) Inventors: Eric Norman Lais, Poughkeepsie, NY (US); Steve Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/839,857

(22) Filed: Jul. 20, 2010

(65) Prior Publication Data

US 2012/0023280 A1    Jan. 26, 2012

(51) Int. Cl.
 G06F 12/00 (2006.01)
 G06F 13/36 (2006.01)
 G06F 13/28 (2006.01)
(52) U.S. Cl. ......... 710/306; 710/200; 710/308; 711/152
(58) Field of Classification Search .................... 710/22, 710/200, 306, 310–315, 308; 711/117–118, 711/126, 133, 134, 141–145, 150–152, 167–168, 711/206–210
See application file for complete search history.

(56) References Cited

U.S. PATENT DOCUMENTS

| | | | |
|---|---|---|---|
| 6,654,830 B1 | 11/2003 | Taylor et al. | |
| 7,500,072 B2 | 3/2009 | Arndt | |
| 2004/0064601 A1 | 4/2004 | Swanberg | |
| 2006/0294326 A1* | 12/2006 | Jacobson et al. | 711/156 |
| 2007/0260768 A1* | 11/2007 | Bender et al. | 710/22 |
| 2007/0260839 A1* | 11/2007 | Arndt | 711/165 |
| 2007/0294702 A1* | 12/2007 | Melvin et al. | 718/104 |
| 2008/0109565 A1* | 5/2008 | Ajanovic et al. | 710/8 |
| 2008/0282058 A1* | 11/2008 | Maher et al. | 712/7 |
| 2012/0023302 A1* | 1/2012 | Arndt et al. | 711/165 |

OTHER PUBLICATIONS

Santhanaraman et al., Designing Passive Synchronization for MPI-2 One-Sided Communication to Maximize Overlap, Department of Computer Science and Engineering, The Ohio State University.
Recio, Renato J., Server I/O Networks, Past, Present, and Future, SIGCOMM'03, Aug. 25-29, 2003, Karlsruhe, Germany.

* cited by examiner

Primary Examiner — Thomas J Cleary
(74) Attorney, Agent, or Firm — Yudell Isidore Ng Russell PLLC

(57) ABSTRACT

A method and data processing system enables scheduling of atomic operations within a Peripheral Component Interconnect Express (PCIe) architecture during page migration. In at least one embodiment, firmware detects the activation of a page migration operation. The firmware notifies the I/O host bridge, which responds by setting an atomic operation stall (AOS) bit to a pre-established value that indicates that there is an ongoing migration within the memory subsystem of a memory page that is mapped to that I/O host bridge. When the AOS bit is set to the pre-established value, the I/O host bridge prevents/stalls any received atomic operations from completing. The I/O host bridge responds to receipt of receipt of an atomic operation by preventing the atomic operation from being initiated within the memory subsystem, when the AOS bit is set to the pre-established value. The AOS bit is reset when the migration operation has completed.

20 Claims, 10 Drawing Sheets

ATOMIC OPERATIONS WITH PAGE MIGRATION IN PCIE

CROSS-REFERENCE TO RELATED APPLICATION

The present application is related to the following co-pending, commonly assigned, patent application, filed on even date herewith, and incorporated herein by reference in its entirety: U.S. patent application Ser. No. 12/839,883, titled "Concurrent Atomic Operations with Page Migration in PCIe.

BACKGROUND

1. Technical Field

The present invention relates in general to data processing, and in particular, to input/output (I/O) operations in a data processing system. More particularly, the present invention relates to processing PCI Express atomic operations in a data processing system.

2. Description of the Related Art

Page migration is a supported function within the memory subsystem of conventional data processing systems. With these conventional data processing system architectures, specific rules/protocols are enforced whereby only certain types of input/output (I/O) operations are permitted to on the memory page being migrated during the actual migration, while other types of operations are not allowed to be completed. One example of the types of operations allowed to complete during a page migration is an Input/Output (I/O) direct memory access (DMA) operation. The methodology by which I/O DMA operations are permitted to continue executing on a page that is being migrated has been described in the art and involves specific protocols, which are also described in the art.

The rules related to I/O operations during page migration and the allowance of I/O DMA operations pursuant to these rules have been adopted within the Peripheral Component Interconnect (PCI) Express (PCIe) protocol by which code/logic of the PCIe Host Bridge (PHB) receives and schedules I/O operations from various connected I/O devices. Within the PCIe protocol, inbound posted memory writes are referred to as DMA Writes and are permitted to be completed while the target page is being migrated. Likewise, DMA Reads, which are a first type of inbound non-posted memory operations, are permitted during page migration. However, PCIe atomic operations, which are second type inbound non-posted operation, are not permitted to be executed during an ongoing page migration because they violate the existing migration rules.

SUMMARY

Embodiments described herein provide a method, a data processing system and a processor that enables scheduling of atomic operations within a Peripheral Component Interconnect Express (PCIe) architecture during a page migration. In at least one embodiment, the method comprises the following hardware/software/firmware implemented processes: firmware within the data processing system detecting the activation of a page migration operation, which migrates a memory page of data from a source memory location to a destination memory location; the firmware notifying the I/O host bridge, and the I/O host bridge setting an atomic operation stall (AOS) bit to a pre-established value that indicates that there is an ongoing migration within the memory subsystem of a memory page that is mapped to the I/O host bridge; wherein, when the AOS bit is set to the pre-established value, the I/O host bridge prevents/stalls any received atomic operations from completing. The method further comprises: the I/O host bridge detecting receipt of an atomic operation; and in response to detecting receipt of the atomic operation: the I/O host bridge autonomously checking the value of the AOS bit; and when the AOS bit is set to the pre-established value, preventing the atomic operation from being initiated within the memory subsystem.

In the described embodiment, when the page migration is completed and no other page migration is ongoing that involves a page mapped through the I/O host bridge, the method further comprises resetting the value of the AOS bit to a next value other than the pre-established value. The atomic operation is dispatched for execution within the memory subsystem when the current value of the AOS bit is not the pre-established value.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DESCRIPTION OF ILLUSTRATIVE EMBODIMENTS

Figure 1:
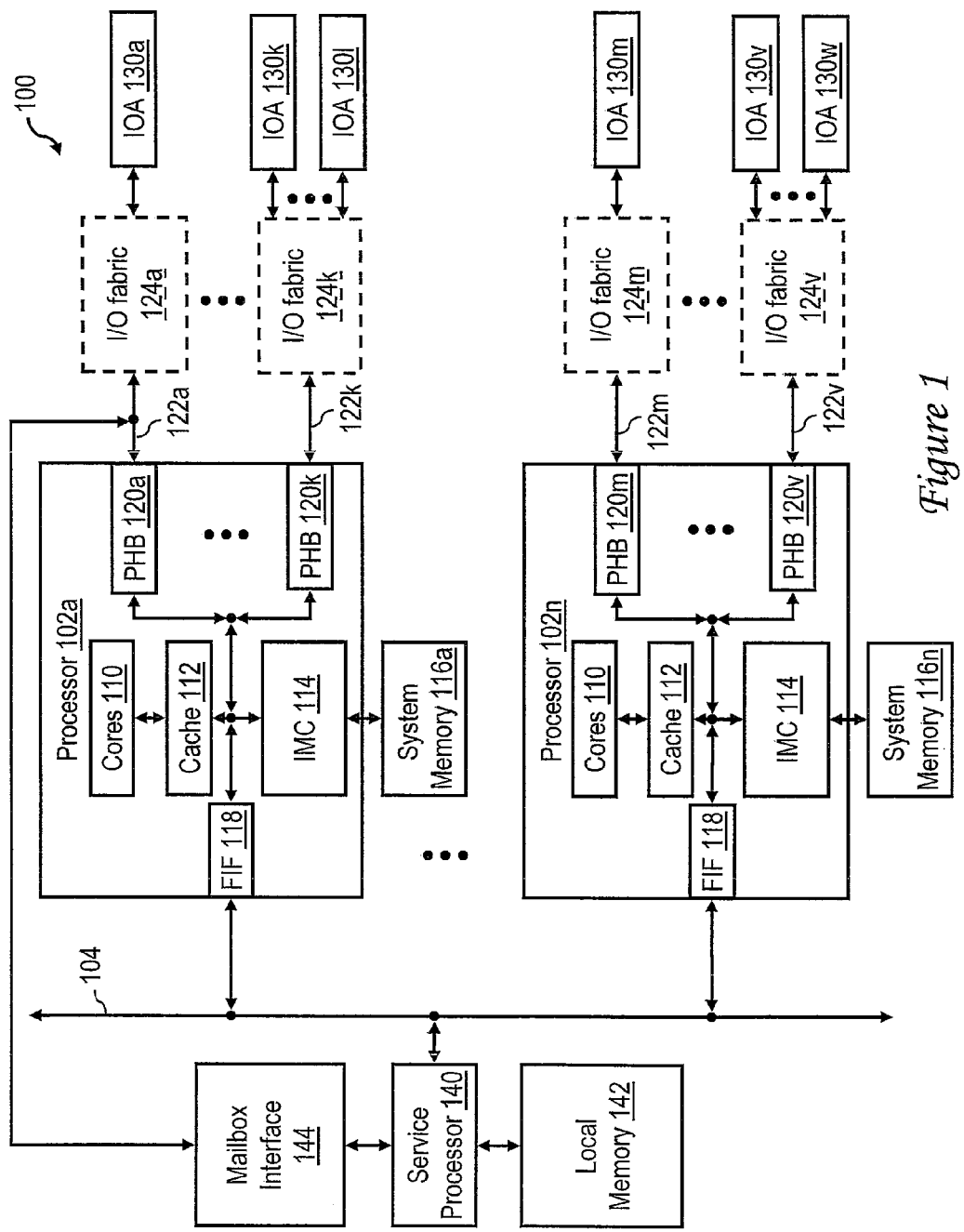
FIG. 1 is a high level block diagram of an exemplary data processing system in accordance with one embodiment.

Embodiments described herein provide a method, a data processing system and a processor that enables scheduling of atomic operations within a Peripheral Component Interconnect Express (PCIe) architecture during a page migration. In at least one embodiment, the method comprises the following hardware/software/firmware implemented processes: firmware within the data processing system detecting the activation of a page migration operation, which migrates a memory page of data from a source memory location to a destination memory location; the firmware notifying the I/O host bridge of the migration, and the I/O host bridge setting an atomic operation stall (AOS) bit to a pre-established value that indicates that there is an ongoing migration within the memory subsystem of a memory page that is mapped to the I/O host bridge; in response to detecting receipt of the atomic operation: the I/O host bridge autonomously checking the value of the AOS bit; and when the AOS bit is set to the pre-established value, preventing/stalling the atomic operation from being initiated within the memory subsystem.

In the described embodiment, when the page migration is completed and no other page migration is ongoing that involves the page mapped through the I/O host bridge, the method further comprises resetting the value of the AOS bit to a next value other than the pre-established value. The atomic operation is dispatched for execution within the memory subsystem when a value of the AOS bit is not the pre-established value.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof. As further described below, implementation of the functional features of the invention is provided within different processing components and involves use of a combination of hardware, firmware, as well as several software-level constructs. It is appreciated that other components may provide the described functionality in alternate embodiments, which would necessarily fall within the equivalent scope of the described implementations/embodiments.

Within the provided descriptions of the figures, similar elements are frequently provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and in particular with reference to FIG. 1, there is depicted a high level block diagram of an exemplary data processing system 100 in accordance with one embodiment. In some embodiments, data processing system 100 may be, for example, a symmetric multiprocessor (SMP) system including a plurality of processors 102a-102n, each coupled for communication to a system fabric 104, which may include one or more bused or switched communication links. For example, data processing system 100 may be implemented with an IBM eServer, a product line of International Business Machines Corporation of Armonk, N.Y. In alternative embodiments, a data processing system with a single processor 102 may be utilized.

In the depicted embodiment, each processor 102 is realized as a single integrated circuit chip having a substrate in which semiconductor circuitry is fabricated, as is known in the art. As shown, processor 102 includes a plurality of processor cores 110 that process data through the execution and/or processing of program code/instructions, which may include, for example, software and/or firmware and associated data, if any. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116. For simplification of the description herein, the system memories 116 are collectively/interchangeably referred to as a memory subsystem.

Each processor 102 further includes a fabric interface (FIF) by which processor 102 communicates with system fabric 104, as well as one or more (with multiple illustrated) host bridges supporting input/output (I/O) communication with various input/output adapters (IOAs) 130. In the depicted embodiment, one or more of the host bridges are implemented as Peripheral Component Interconnect (PCI) Host Bridges ("PHB") 120, but in other embodiments the host bridges may implement one or more additional or alternative I/O bus standards. It is further appreciated that the I/O protocol being supported by the PHBs includes the PCI Express (PCIe) protocol.

PHBs 120a, 120k, 120m and 120v provide interfaces to PCI local buses 122a, 122k, 122m and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w are coupled to PCI local bus 122v optionally through I/O fabric 124v. PCI IOAs 130v and 130w may comprise, for example, a display adapter and hard disk adapter.

As shown in FIG. 1, embodiments described herein provide an improved PHB 120 in which PHB 120 is integrated within the integrated circuit chip of processor 102. It is appreciated that embodiments of the invention may be implemented within one or more PHBs 120 provided in one or more integrated circuit chips that are separate from the processor chip.

Data processing system 100 further includes a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM)) and non-volatile memory (e.g., non-volatile random access memory (NVRAM) or static random access memory (SRAM)). Service processor 140 is further coupled to a mailbox interface 144 through which service processor 140 communicates I/O operations with PCI bus 122a.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

To facilitate the descriptions of the embodiments that follows, it is first necessary to have an understanding of atomic operations and the limitations that are present when attempting to implement atomic operations in a conventional data processing system, where I/O devices coupled to, for example, PCI IOAs 130a, generate atomic operations that target memory pages that may be currently undergoing a page migration. Atomic operations involve a sequence of data operations on a particular memory block within a page of memory, whereby data at the particular address is read out of memory, and then following some intermediate data operation, the data is then conditionally and automatically written back to the memory address space. In conventional data processing systems that are configured with I/O devices coupled to the PCIe bus architecture, these atomic operations have not previously been supported within the PCIe protocol, and as such, PCIe atomic operations were simply not permitted under the established rules/protocols. Thus with conventional systems, to prevent the possible corruption of data during data migration, systems configured with PCIe architecture do not permit page migration of any page that is mapped by a PCIe-connected device that implements atomic operations.

Figure 8:
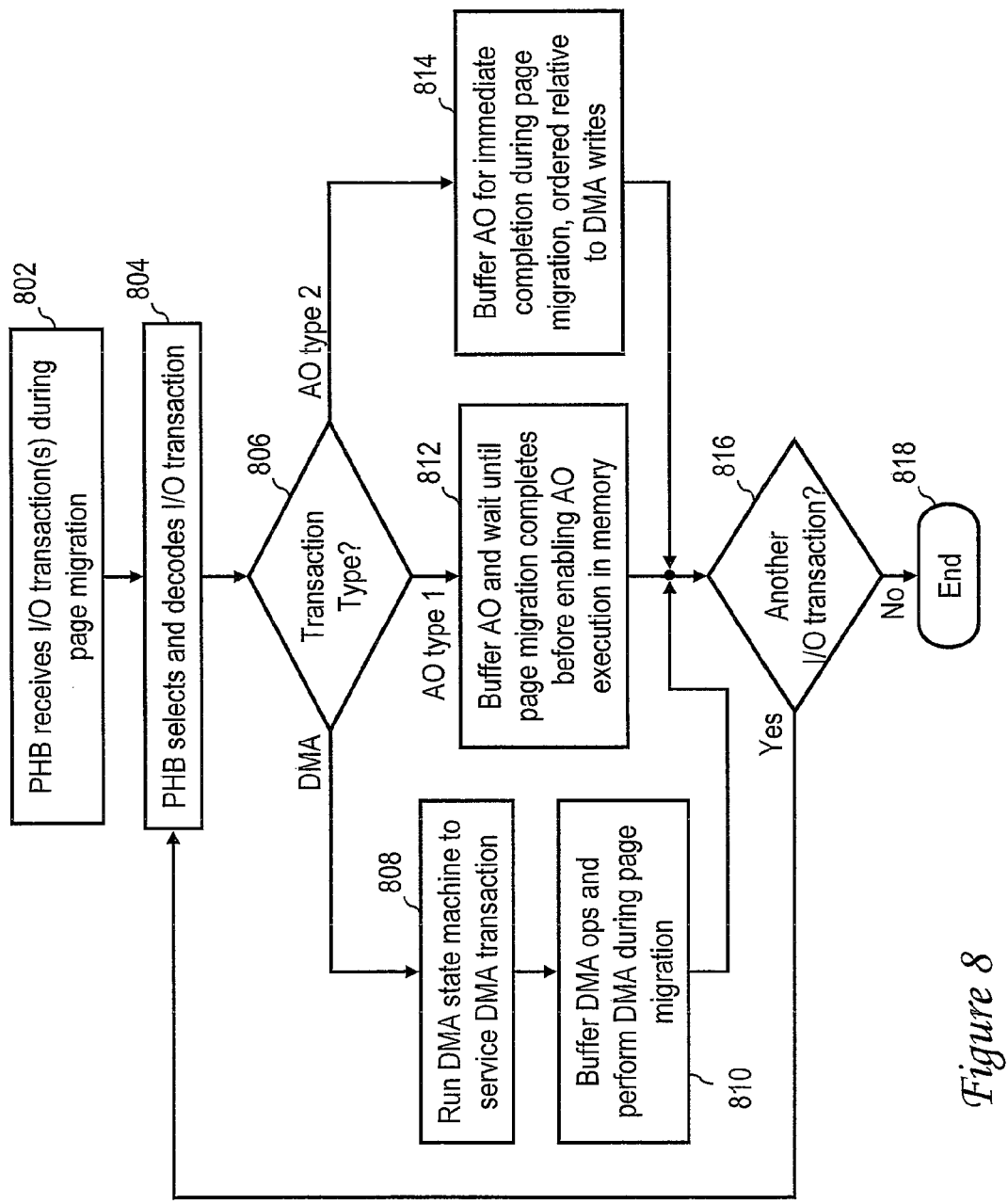
FIG. 8 is a high level logical flow diagram of the processing by the PHB of received I/O operations including atomic operations and DMA operations, according to one exemplary embodiment.
Figure 9:
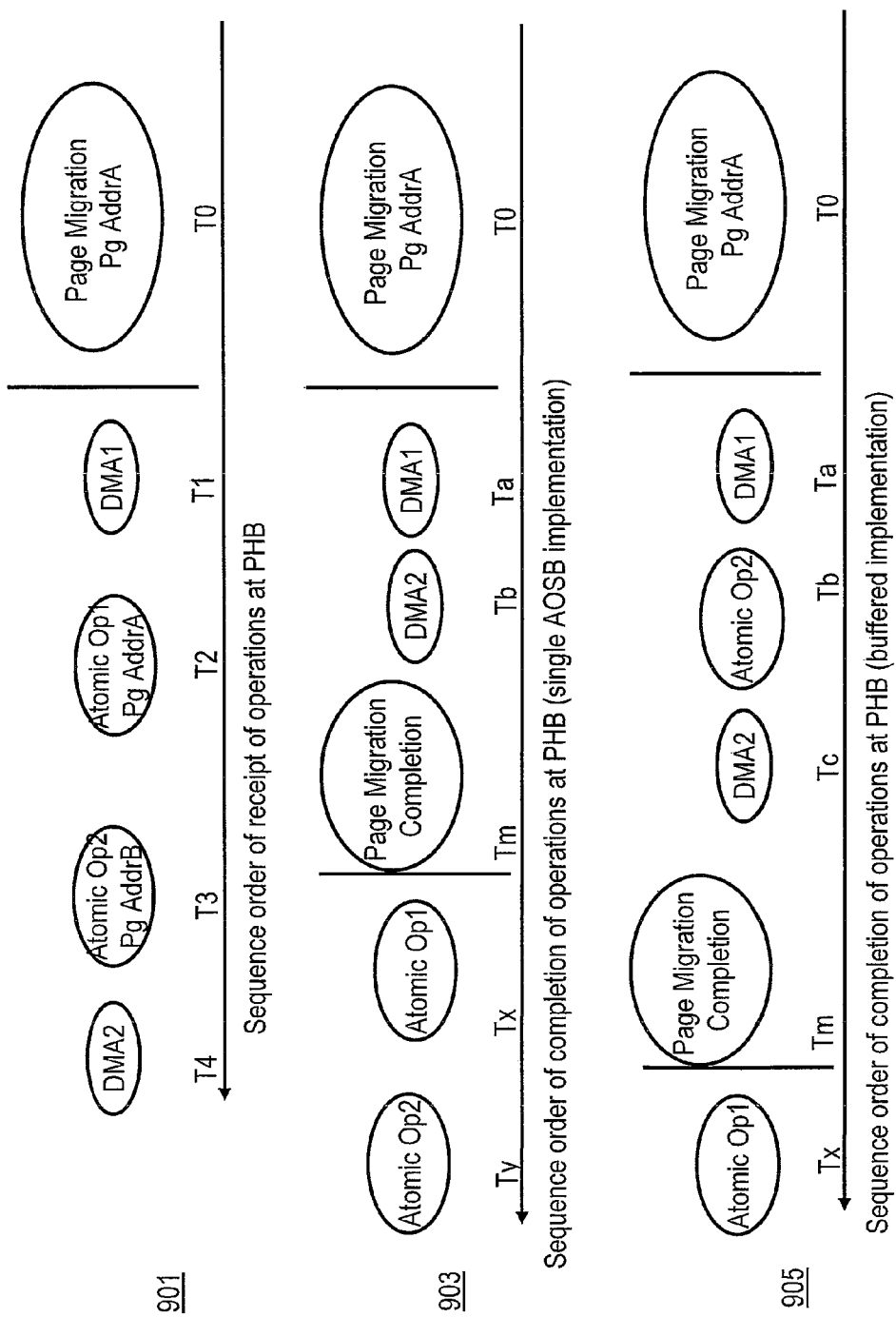
FIG. 9 is a sequence diagram showing three timelines for receipt and dispatch of I/O operations received at the PHB configured according to FIG. 4, in accordance with one illustrative embodiment.

The described embodiments presents two solutions which overcome these limitations with the prior art implementation of rules preventing page migration of pages that may be subject to access by atomic operations from PCIe-connected devices. Specifically, the below described embodiments provides two different implementations that allow for PCIe atomic operations to be supported within data processing systems configured with the enhanced PCIe bus architecture described herein. The first embodiment is generally presented via the PHB architecture of FIG. 2 and flow chart of FIG. 3. The second embodiment is generally presented via the PHB architecture of FIG. 4 and flow charts of FIGS. 5 and 6, while FIG. 7 provides an alternate embodiment. FIGS. 8 and 9 then presents the scheduling protocols implemented within a PHB configured according to the second embodiment (FIG. 4), where DMA operations and atomic operations are both received by the PHB for scheduling/completion within the memory subsystem.

Generally, the illustrative embodiments are implemented with the understanding that resolving the problem of not supporting page migration of pages that may be subject to atomic operations within a PCIe architecture, requires implementation of a modified PHB architecture and/or methodology (including firmware/logic/software) by which atomic operations received at the PHB may be temporarily stopped/stalled from executing on the memory subsystem while the targeted page is undergoing a migration.

Figure 2:
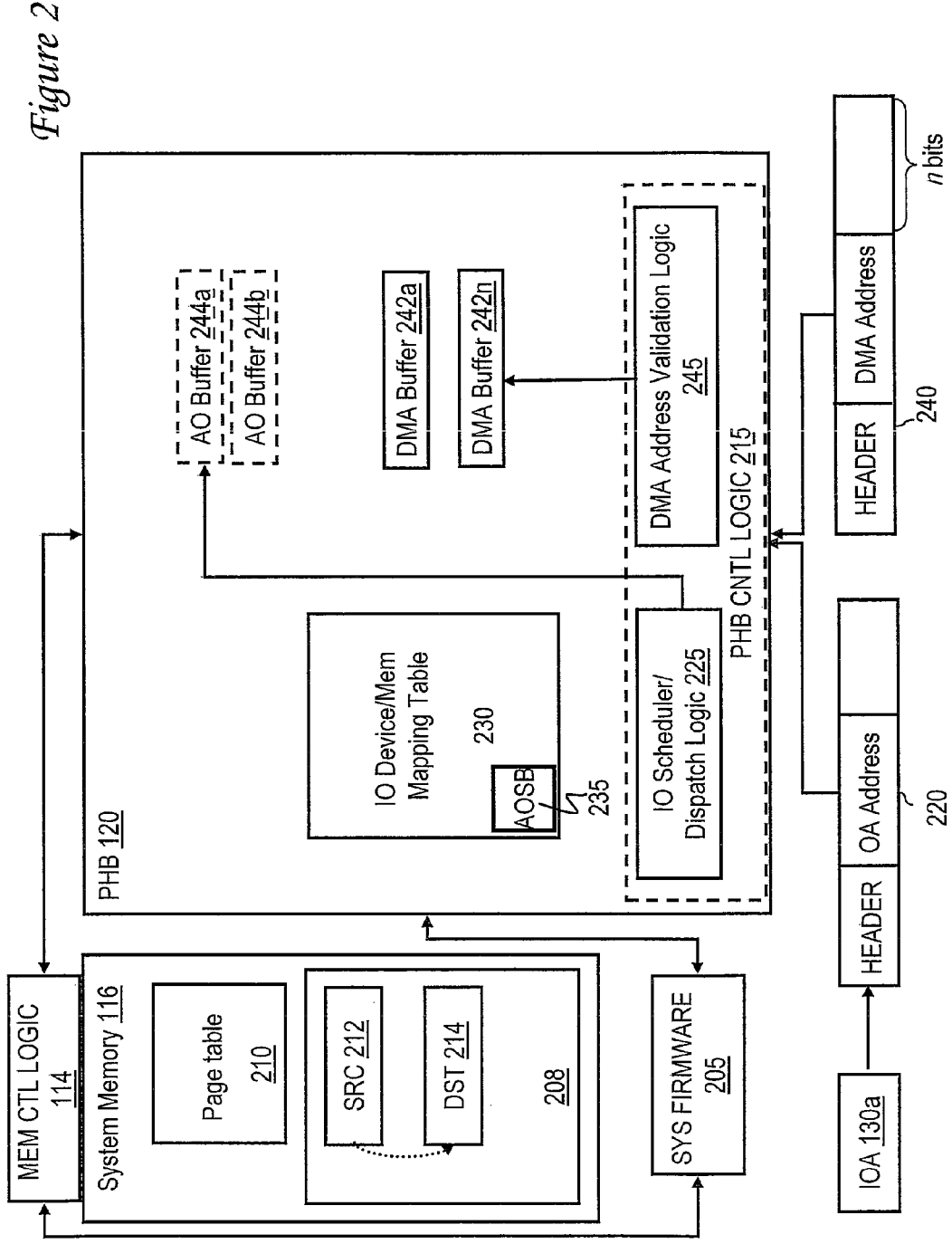
FIG. 2 is a logical view of portions of the input/output (I/O) and memory subsystems of the data processing system, consisting of system memory and improved Peripheral Component Interconnect (PCI) host bridge (PHB) with hardware and firmware structures that enable the scheduling of atomic operations during page migration, according to one exemplary embodiment.

With reference now to FIG. 2, there is illustrated a graphical view of the components of the PHB and memory subsystem that are associated with scheduling an atomic operation during an ongoing page migration within the memory subsystem. More specifically, FIG. 2 illustrates the enhancement provided within the improved PHB of an additional bit/register to enable atomic operations to be handled by the PHB, while supporting page migration of potentially targeted pages for atomic operations. As shown, system memory 116 includes page table 210 and memory pages 208, of which source (Src) page 212 and destination (Dst) page 214 are illustrated. Src page 212 represent the example page being moved by a page migration operation, and Dst page 214 represents the memory location to which the page data is being copied during the migration. Access to system memory 116 is controlled by memory controller 114, which is communicatively coupled to system firmware 205 and to PHB 120, via PHB control logic 215.

PHB 120 comprises PHB control logic 215, which includes I/O Scheduler/dispatch logic 225 and DMA address validation logic 245. Other functional logic components may be present within PHB control logic 215, but are not germane to the present description. For example, PHB 120 may include a wide data structure referred to as Translation and Validation Table (TVT) which provides a plurality of Translation and Validation Entries (TVEs) utilized to process incoming I/O transactions. As illustrated, PHB 120 further comprises I/O device/memory mapping table 230, which is a register that maps the I/O devices (not shown) coupled to the IOA 130a (which is communicatively connected to PHB 120) with the pages of memory that the I/O devices may access/target during their I/O operations through PHB 120. I/O scheduling/dispatch logic 225 reads mapping information from I/O device/mem mapping table 230 and, in one embodiment, generates buffer entries for the atomic operations (referred to herein as AO buffer 244a, 244b). I/O scheduling/dispatch logic 225 utilizes one or more available I/O dispatch buffers available to the PHB 120 to temporarily store/stall atomic operations 220 that are received for dispatch to system memory 116. DMA address validation logic 245 performs address validation for received DMA operations 240 (through one or more processes not relevant to the present description) and buffers the received DMA operations within available I/O dispatch buffers, referred to as DMA buffer 242a . . . n, to simplify the descriptions herein.

In addition to the above components, PHB 120 also comprises an atomic operation stall (AOS) bit 235. While illustrated as located within I/O device mapping table 230, it is appreciated that the location of the AOS bit is variable and is a design choice. In one embodiment, the AOS bit is located within a migration register (not shown) of the PHB 120. Any register and/or cache that is accessible to the I/O scheduler/dispatch logic 225 may be utilized to store the AOS bit 235. Further, while described as a bit, the embodiments contemplate that the functionality provided by this novel construct may extend beyond simply being a single binary value, and may provide more information than a simple yes/no, on/off condition that is conveyed with a single bit implementation.

The functional usage of this AOS bit 235 is presented in detail below in the description of FIG. 3. Generally, however, the functions are associated with the operations of the I/O scheduler/dispatch logic 225 and to some extend the system firmware 205.

As described in detail below, the architecture of the PHB 120 is enhanced with the introduction of the AOS bit (or bits), which is set to one of at least two values by the I/O scheduler/dispatch logic 225 based on whether or not a page is being migrated within system memory. Specifically, the AOS bit 235 is set to a first pre-established value that causes the AO dispatch logic to stall all PCIe atomic operations received at the PHB 120 during any period during which any page mapped through that PHB 120 is being migrated. The mapping of the specific pages to I/O devices supported by the PHB 120 is provided within the I/O device/memory mapping table 230. The AOS bit 235 is set at the start of the page migration by the PHB control logic 215, which receives a trigger to set the bit from system firmware 205. In this embodiment, the firmware 205 sets an AOS bit (or migration bit) located in system memory 116, and the PHB control logic 215 reads this AOS bit in memory at some established interval or based on receipt of a trigger that is generated and sent to/detected by the PHB 120 whenever the AOS bit is set and/or re-set. In one alternate implementation, the AOS bit 235 within the PHB 120 is set by the firmware/software. When the page migration is completed, the system firmware 205 also resets the AOS bit 235. Thus, atomic operations and page migration are both supported by the PHB 120, which acts as a gatekeeper to prevent the atomic operation to interfere with the validity/reliability of the page data being migrated. In the embodiments contemplated, each PHB will contain an AOS bit to be utilized to stall all PCIe atomic operations received by the PHB during the time that any page that is mapped through that PHB is being migrated.

Figure 3:
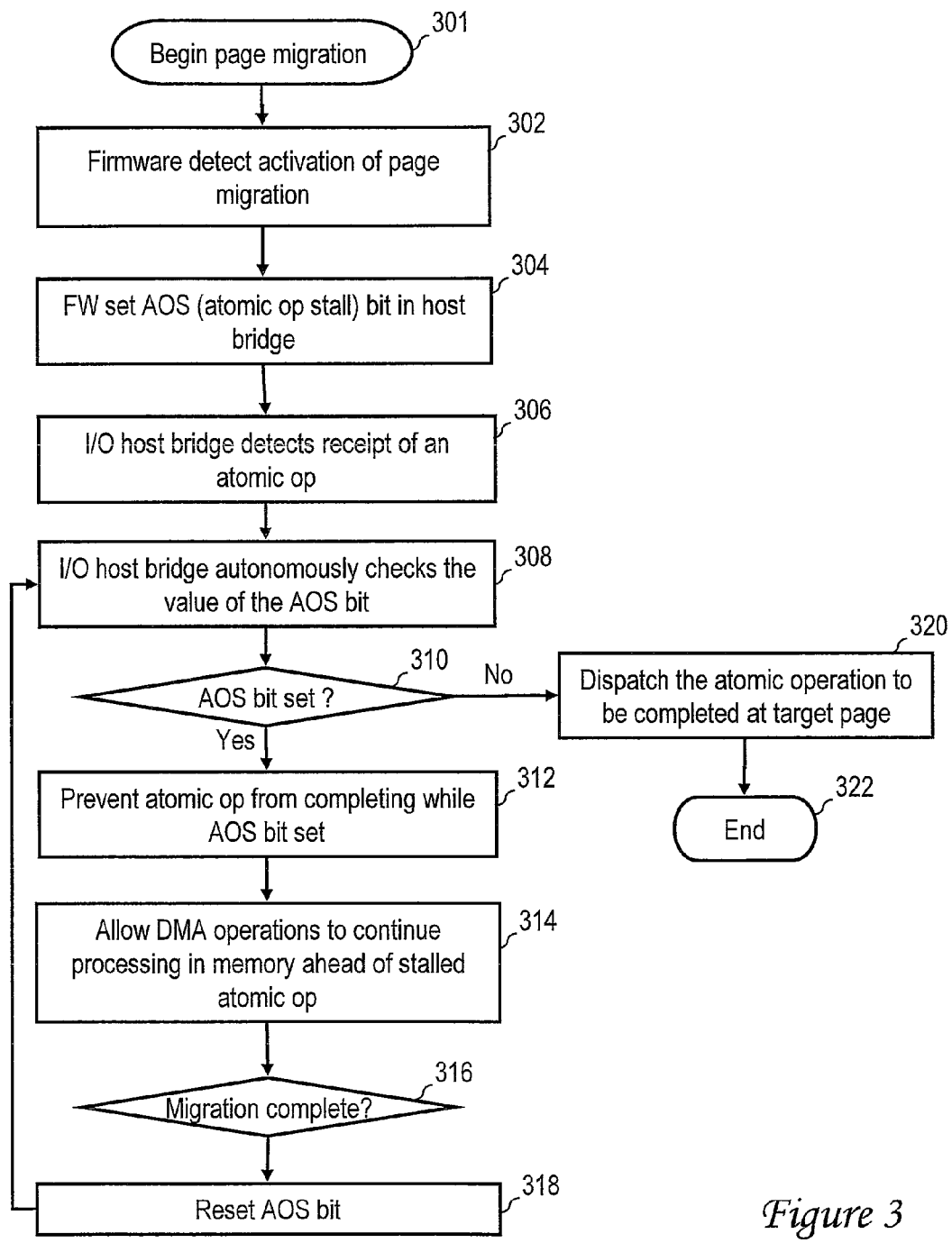
FIG. 3 is a high level logical flow chart of a method by which atomic operations are scheduled for later execution via an atomic operation stall (AOS) bit when the atomic operation is received during a page migration, in accordance with one embodiment.

Turning now to FIG. 3, there is provided a first flow chart illustrating the method implemented (via executable code or firmware) within the PHB 120 to enable several of the functions/processes described herein. Generally, each of the below described flow charts illustrate various methods by which different aspects of the described embodiments are completed. Although the methods illustrated by the various flow charts may be described with reference to components shown in specific ones of FIGS. 1, 2 and 4, it should be understood that this is merely for convenience and alternative components and/or configurations thereof can be employed when implementing the various methods. Key portions of the methods may be completed by the PHB control logic 215 and/or firmware/utility associated with the memory structure, the data processing system, and/or PHB control logic 215. A micro processing component within the PHB controller 215 executes specific code/firmware/instructions, the execution of which is in turn triggered by the activation of a page migration within the memory subsystem. This execution then performs the various functions described herein in the first and/or the second embodiments. For consistency, various aspects of the methods are thus described from the perspective of PHB control logic 215 or system firmware 205, and/or a PCIe migration/atomic operation handling utility (not specifically shown) or the data processing system 100 generally.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to the above described embodiment, the firmware/software/logic (205, 215) controlling the illustrated method completes the following general functions: (1) determine which PHBs have I/O devices attached, which devices have a mapping to the page being migrated; (2) set the AOS bit in each of those PHBs; (3) setup the migration operation, and migrate the data; and (4) reset the AOS bits when the migration is completed. More generally, these functions are provided within a data processing system having an input/output (I/O) subsystem including at least one I/O host bridge and a memory subsystem with a page table. As described herein and illustrated by FIG. 2, the I/O host bridge comprises a PCIe host bridge (PHB) and the atomic operations are PCIe Atomic operations. Also, the AOS bit 235 is a predefined construct within a pre-established location within a register of the PHB (or within a memory location accessible by the PHB control logic 215).

With specific reference now to FIG. 3, the method by which the functions are provided include: firmware (e.g., firmware 205) within the data processing system 100 detecting the activation of a page migration operation (at block 302), which migrates a memory page of data from a source memory location (Src 212) to a destination memory location (Dst 214). The firmware sets an atomic operation stall (AOS) bit 235 within the I/O host bridge (e.g., PHB 120) to a pre-established value (e.g., a logic "1", as opposed to a logic "0") that indicates that there is an ongoing migration within the memory subsystem (system memory 116) of a memory page that is mapped to the I/O host bridge (block 304). In an alternate embodiment, the firmware sets an AOS bit within memory, and the bit is read by the I/O host bridge and triggers the I/O host bridge to stall dispatch/execution of any received atomic operations. When the data processing system comprises multiple I/O host bridges that are mapped to the memory page(s) associated with the page migration operation and which I/O host bridges include mappings to devices that generate atomic operations, the system firmware 205 automatically triggers the setting of the migration bit in each of the multiple I/O host bridges. Based on the system design and/or improved PCIe protocol, when the AOS bit 235 is set to the pre-established value, the I/O host bridge prevents/stalls any received atomic operations (e.g., AO 220 received from an I/O device (not shown) couple to IOA 130a) from completing. The I/O host bridge detects receipt of the atomic operation (block 306), and in response to detecting receipt of the atomic operation, the I/O host bridge autonomously checks the value of the AOS bit to see if the bit is set (block 308).

When the AOS bit 235 is set to the pre-established value (as determined at block 310), the I/O host bridge prevents the atomic operation from being initiated within the memory subsystem (block 312). As shown at block 314, DMA operations continue to be processed in memory ahead of the stalled atomic operation. The firmware checks for whether the migration operation has completed (block 316). When the page migration is completed and no other page migration is ongoing that involves the page mapped through the I/O host bridge, the firmware resets the value of the AOS bit to a next value other than the pre-established value (block 318). The atomic operation is dispatched for execution within the memory subsystem when a value of the AOS bit is not the pre-established value, and, at block 320, the I/O host bridge dispatches the atomic operation to execute within the memory subsystem. The process then terminates at block 322.

In one embodiment, which is described in greater detail below with reference to FIGS. 8 and 9, the AOS bit stalls the PCIe atomic operations, but does not stall the received DMA operations. Thus, according to this embodiment, the method further includes: receiving a direct memory access (DMA) operation targeting the memory page being migrated; and allowing the DMA operation to bypass the pending/stalled Atomic Operation and complete the DMA operation on the memory page (block 318). In one implementation, the I/O host bridge separately buffers the DMA operations from the atomic operations (see buffers in FIG. 2) and enables the buffered DMA operations to proceed during the page migration.

With the above described and illustrated embodiments, the AOS bit effectively operates as an on/off switch for the PHB's ability to support PCIe atomic operations while a migration of a page mapped to/through the PHB is scheduled or ongoing. With this embodiment, all of the PCIe atomic operations arriving at/passing through the PHB are stalled whenever a mapped page that is being migrated and there is any attempt to perform an atomic operation while that migration is ongoing, with no consideration given to whether the page being migrated is the same as the page being targeted by the atomic operation.

Figure 4:
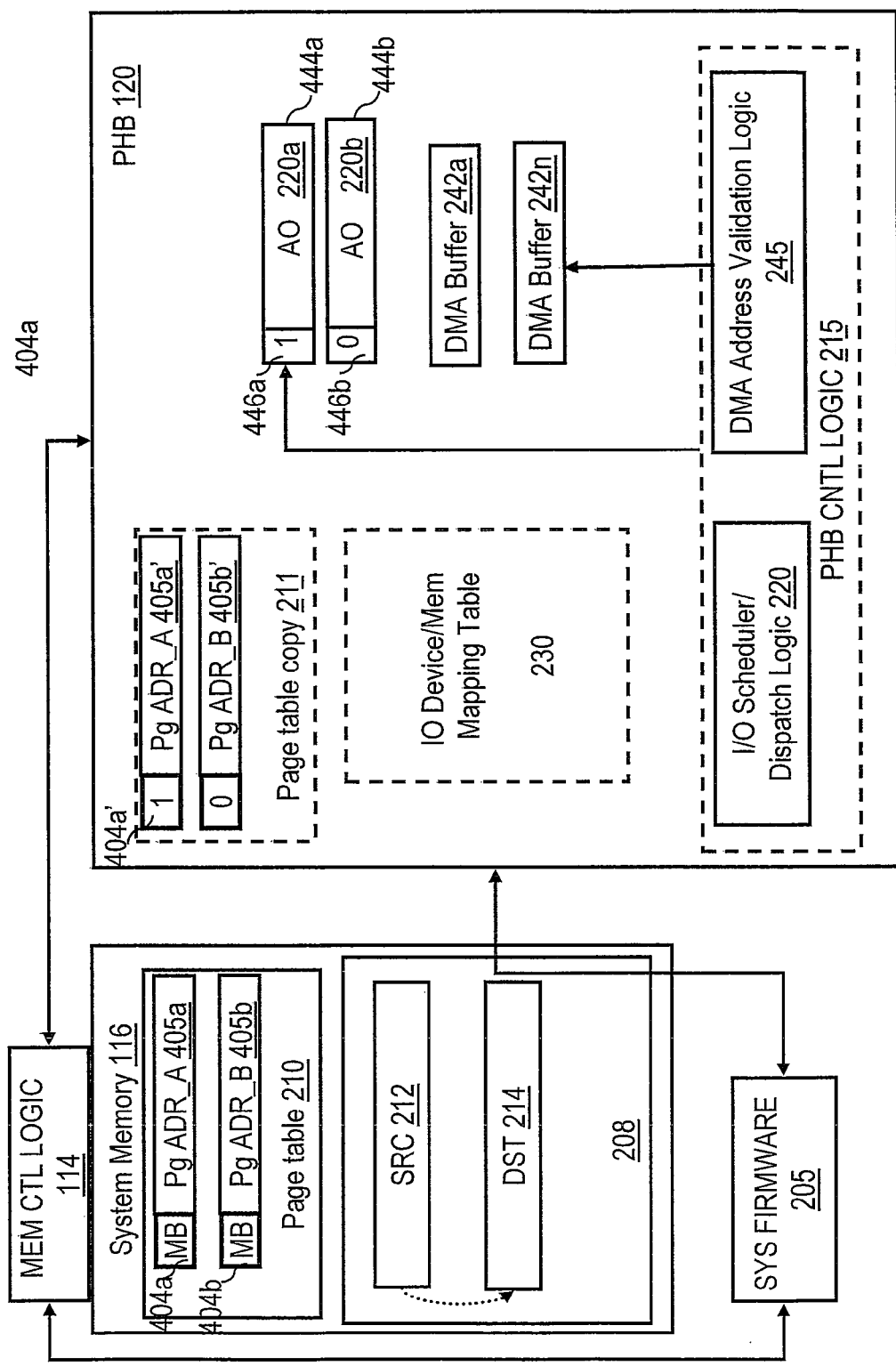
FIG. 4 is a logical view of portions of the input/output (I/O) and memory subsystems of the data processing system, consisting of system memory and an improved Peripheral Component Interconnect (PCI) host bridge (PHB) with hardware and firmware structures that enable the operation-specific scheduling of atomic operations during page migration, according to one exemplary embodiment.

With reference now to FIG. 4, there is illustrated a different configuration/architecture of an enhanced/improved PHB and memory subsystem. With this second embodiment, rather than utilizing a single general AOS bit for the entire PHB (or memory) to stall all atomic operations from executing while migration of any PHB-mapped page is ongoing in system memory, specific AOS bits are provided within the AO buffers to individually identify which atomic operations are to be stalled versus which atomic operations can be permitted to proceed while the page migration is ongoing. The solution provided by this separate embodiment involves the PHB selectively stalling only PCIe atomic operations which target a page that is being migrated, while allowing PCIe atomic operations that do not target a page being migrated to continue normally. The advantage of this methodology is that atomic operation are allowed to flow until they are really needed to be stopped, and atomic operations not affected by the page being migrated can flow past atomic operations that are stalled.

The larger structural/functional components illustrated by FIG. 4 (e.g., system memory, firmware, PHB, PHB control logic, etc.) are similar to those of FIG. 3 and are therefore not specifically described. In addition to these previously described structural/functional components, additional components are provided to enhance/enable the functionality of the presently described embodiment. First, each entry of the page table 210 within system memory 116 is provided a migration bit that is set (to a first value, such as a logic "1") to indicate initiation and/or continuation of a migration of that specific page to which the entry refers. As provided by FIG. 4, page table 210 has two page entries identified by page addresses, PgAddrA 405*a* and PgAddrB 405*b*. Each entry then has a respective migration bit associated therewith, MBs 404*a* and MB 404*b*. For the remainder of the description, the assumption will be made that the use of subscript "a" following a reference numeral references a page address that has an associated page migration occurring. Thus the page identified by PgAddrA 405*a* is assumed to be undergoing a page migration. In contrast, the use of subscript "b" with a reference numeral references a page address that does not have a page migration associated therewith. Likewise, with AO buffers 444*a* and 444*b* of PHB 120, the atomic operation 220*a* within AO buffer 444*a* is assumed to be directed to a first page that is currently being migrated, while the atomic operation 220*b* within AO buffer 444*b* is directed to a second page that is not being migrated. In the illustrative embodiment, each AO buffer 444*a* and 444*b* has associated AOS bit 446*a* and 446*b*, respectively, which can be set and reset by the I/O scheduler/dispatch logic 220 (or other firmware/logic, either within or outside of PHB 120). For illustration and by way of example, AOS bit 446*a* is set (to a first pre-determined value that indicates a migration is ongoing on the targeted page), while AOS bit 446*b* has a different/null value, which indicates that the page targeted by the atomic operation in AO buffer 444*b* is not currently being migrated.

With this use of "atomic operation-specific" AOS bits, the PHB 120 is able to support a bypass of stalled atomic operations (also referenced as first type atomic operations) by other atomic operations (second type atomic operations) due to pending or ongoing migrations of the target pages for the stalled atomic operations. As provided by FIG. 4, enabling this atomic operation bypass functionality involves additional buffering and control logic. The PHB hardware is designed to provide an AOS bit within each generated AO buffer in each PHB, and this AOS bit, when set, causes the PHB to stall the PCIe atomic operation in that buffer, but not the second type PCIe atomic operations within other AO buffers. Additionally, as described below, the introduction of the AOS bit does not stall the specified DMA operations received at the PHB.

In one embodiment, the AOS bit is set by the PHB hardware or firmware when the PHB logic 215 or PHB dispatch logic 220 detects that an atomic operation addresses a page of memory that is currently being migrated. Once the migration of that page is completed, the specific AOS bit is then reset by firmware (e.g., 205).

In yet another embodiment, PHB 120 completes the checking of the migration status of the page migrations and updates the AOS bits based on the value of the migration bit within a locally cached copy of the page table 210. Page table copy 211 is stored within PHB 120 and comprises a "close in time" copy of the page table 210 in memory. Updates to page table 210 are signaled to the PHB 120 by system firmware 205 or some other mechanism, and those update are recreated within page table copy 210 (i.e., the entries within page table copy 211 are replaced with newer copies of those entries, which are retrieved from page table 210). In one implementation, modifications to the value of the migration bit 404*a* causes an invalidation signal to be sent to PHB 120, and PHB 120 responds by retrieving a new copy of the page table 210 from memory. The retrieved new copy then replaces the page table copy 211 that has been invalidated. As provided by the example page table copy 211, migration bit 404*a'* is set, which indicates that the corresponding page (at that memory address) is being migrated within memory. With this information gathered from the page table copy 211, PHB logic (215/220) can then determine whether to set the AOS bit of a received and buffered atomic operation. In the specific instance of the illustrative embodiment, it is assume that an atomic operation targeting the page corresponding to the page table entry 405*a* has been received, and that atomic operation is placed in AO buffer 444*a*, whose AOS bit 446*a* has been set to prevent the atomic operation from being dispatched to memory until the migration of the targeted page is completed. Notification of the completion of the migration is then accomplished when the invalidation signal is received from the system firmware 205 once the migration bit 404a in page table entry 405a is reset. In one embodiment, each PHB with a copy of page table 210 subscribes to the controller/logic that updates the page table 210 to receive instant notification of any invalidation or modification of the page table entries.

Thus, with the above implementations, atomic operations are not stalled unless a page is being migrated that is to be accessed by the atomic operations. For each AO buffer that contains valid atomic operations and which does not have the AOS bit set (second type atomic operations), the I/O scheduler/dispatch logic schedules the atomic operations for execution on the memory system, independent of the fact that there may be previously received atomic operations being held in other AO buffers with their AOS bit set (first type atomic operations).

In one alternate embodiment, the PHB hardware recognizes that the migration operation is complete, and the PHB hardware performs an operation to reset the AOS bit for an associated buffer.

Figure 5:
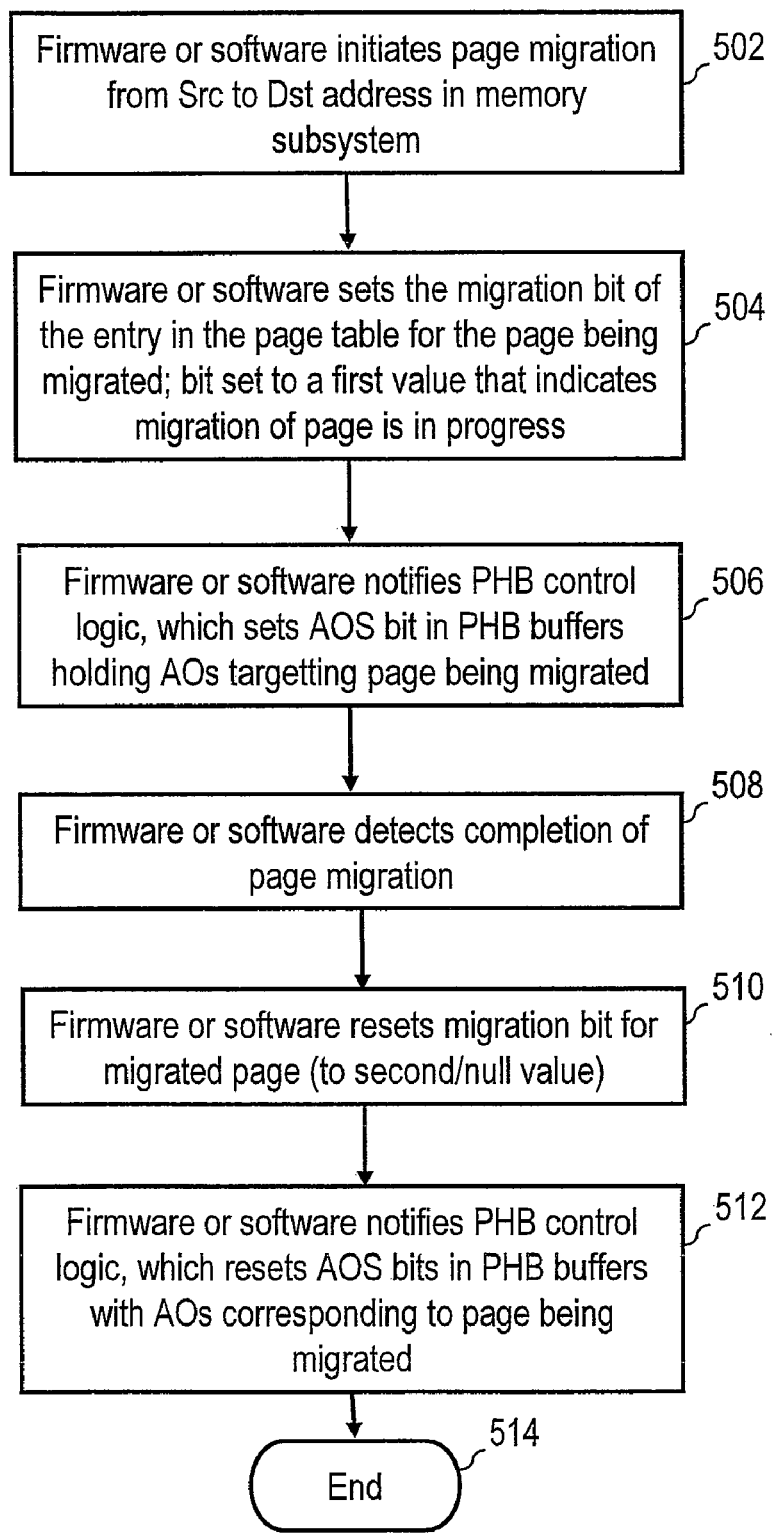
FIG. 5 is a high level logical flowchart of a method by which system firmware triggers the scheduling of atomic operations via setting of a migration bit within a corresponding page table entry and associated processes within the PHB, in accordance with one embodiment.
Figure 6A:
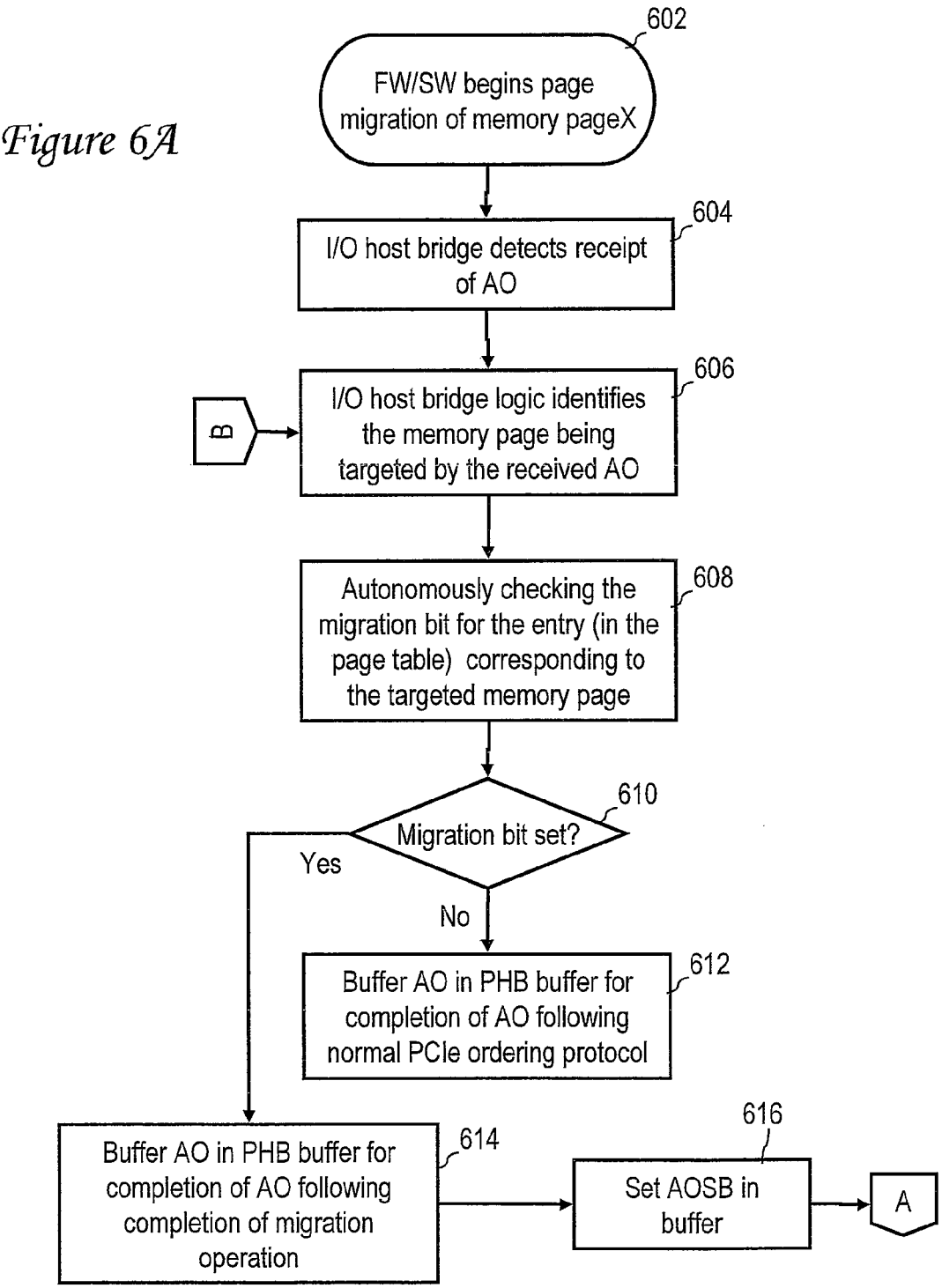
FIG. 6(A-B) depicts a high level logical flowchart of a method by which atomic operations are scheduled for later execution via setting of a page table entry migration bit and corresponding PHB buffer (AOS) bits in accordance with one embodiment.
Figure 6B:
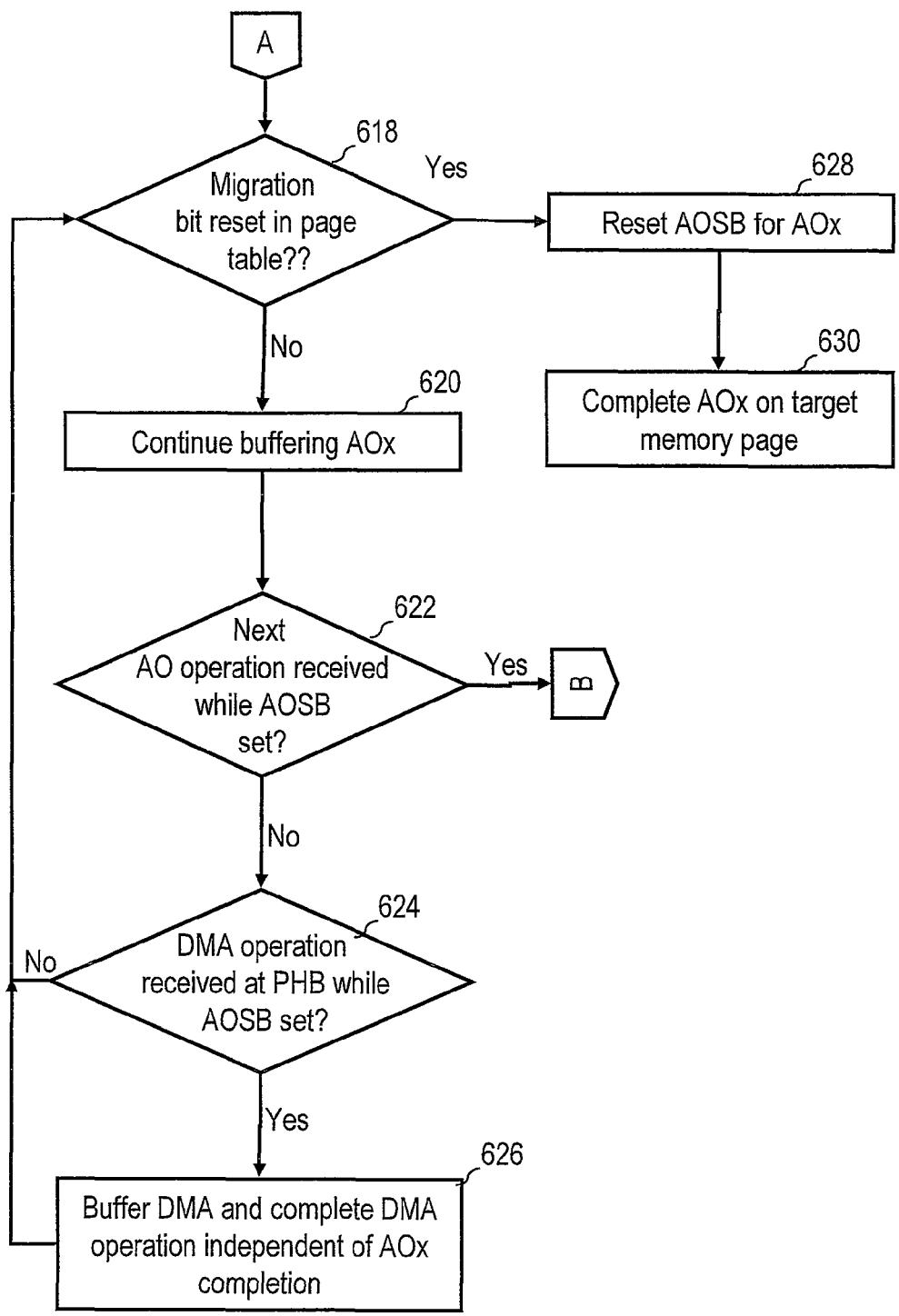
Figure 7:
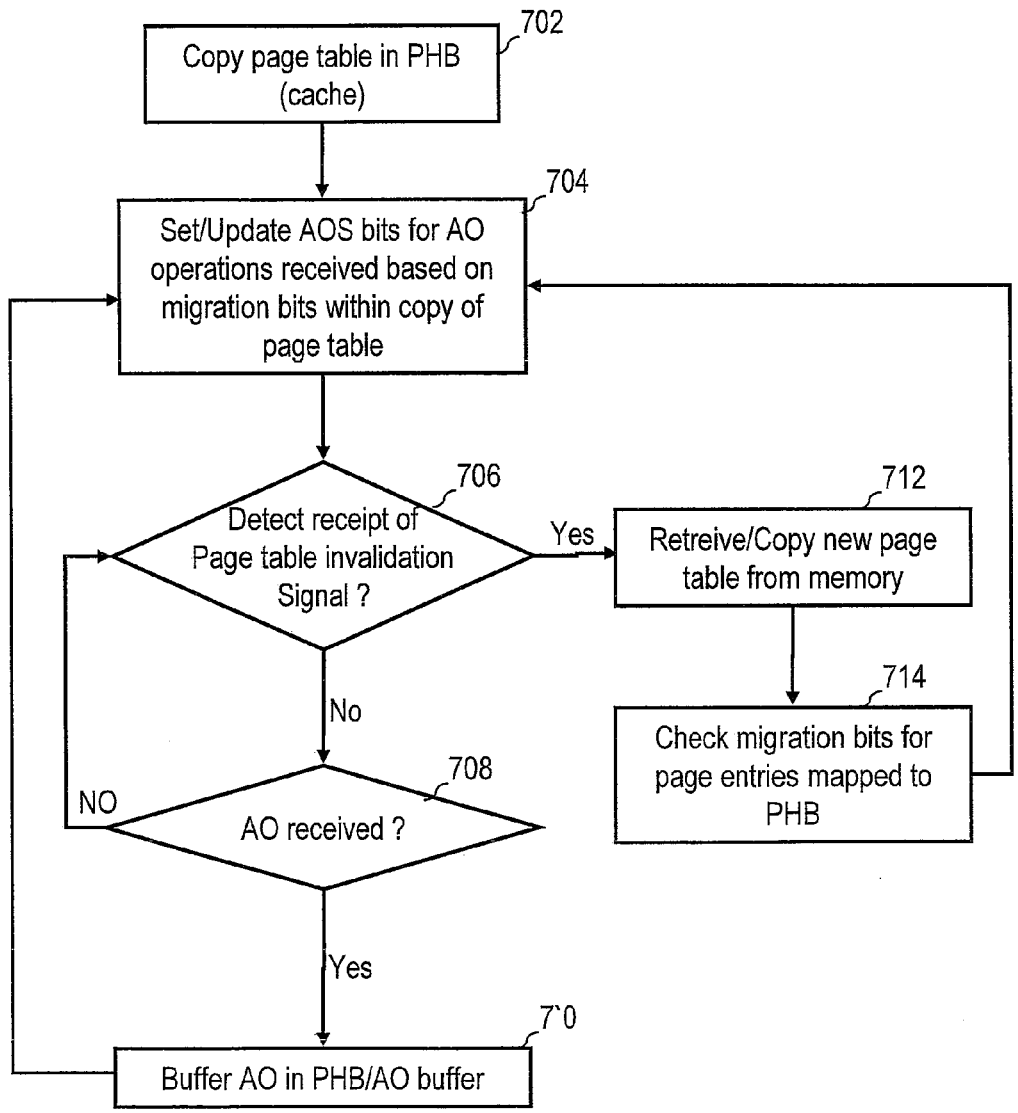
FIG. 7 is a high level logical flowchart of an alternate method by which the PHB receives page migration information for scheduling atomic operations using AOS bits, in accordance with one embodiment.

Turning now to the flow charts of FIGS. 5, 6 and 7, there are provided three different implementation perspectives of the method by which the described features of the second embodiment are implemented. Several of the features/functions of the method are provided by the system firmware, which features are illustrated by FIG. 5. Other functional features are performed by logic/firmware within PHB, and these are illustrated by FIG. 6. Finally, the alternate embodiment in which the page table copy is utilized to provide the updates to the AOS bits within the PHB is illustrated by FIG. 7. Generally, the PHB logic and/or the firmware/software controlling the migration and atomic operation scheduling completes the following sequence of functions: determining which PHBs have devices attached and which currently have atomic operations targeting a page being migrated; initiating the migration operation, and migrating the data; setting the corresponding AOS bits within the AO buffers of the first type atomic operations; detecting the completion of the data migration; and resetting the AOS bits in the affected/associated AO buffers.

Turning now to FIG. 5, the process begins at block 502 at which the firmware/software initiates page migration from the source address to the destination address in the memory subsystem. Concurrently, the firmware/software sets the migration bit of the entry in the page table for the page being migrated (block 504). The bit is set to a first value that indicates that the migration of the page is in progress. The firmware/software notifies PHB control logic 215 of the setting of the migration bit, and the PHB control logic sets the AOS bit in PHB buffers that hold atomic operations that target the page being migrated (i.e., the page associated with the page table entry with the migration bit set) (block 506). In one implementation, the PHB control logic 215 registers with the firmware as a listener/subscriber for updates to the migration bits of the page table entries. The firmware/software detects completion of the page migration (block 508) and resets the migration bit of the migrated page entry (510). The page table entry for the source page is also invalidated. The firmware/software then notifies the PHB control logic 215 of the change to the migration bit, and the PHB control logic 215 resets the AOS bits in the PHB buffers that are holding atomic operations, which target the page that has just completed migration (block 512). The method then ends at block 514.

Referring now to FIG. 6, which is presented on two pages (6A and 6B), the method begins at block 602, which provides that the firmware/software begins page migration of the memory page "X". At block 604, the I/O host bridge detects receipt of a first atomic operation. The I/O host bridge (HB) logic (e.g., PHB control logic 215) identifies the memory page being targeted by the received atomic operation (block 606), and then autonomously checks the migration bit for the entry within the page table that corresponds to the targeted memory page (block 608). At decision block 610, the I/O HB logic determines if the migration bit of the page table entry is set, and if the migration bit is not set, the I/O HB logic places the atomic operation in an AO buffer without setting the AOS bit of that AO buffer. Not setting the AOS bit allows the atomic operation to complete according to normal scheduling of atomic operations (block 612). However, if the migration bit is set, the I/O HB places the atomic operation in an AO buffer with the AOS bit set (block 614) and sets the AOS bit in the AO buffer (616). The atomic operation is thus made to wait until confirmation is received of the completion of the page migration that caused the migration bit to be set in the page table. It is appreciated that the above allocation of AO buffers to multiple pending atomic operations are limited by the number of non-posted data credits that currently exist on the PCIe link at the time the atomic operation is received at the PHB. Rather than illustrate the process by which the PHB checks for available credits before making an assignment of an AO buffer, the described embodiments assume that there are sufficient credits to simultaneously buffer at least one atomic operation, with the atomic operation being a first-type atomic operation that is stalled within the assigned AO buffer.

At decision block 618, I/O HB 205 checks whether the migration bit is reset in the page table. This check may be initiated by other logic components of the overall system, such as the system firmware 205. If the migration bit has not been reset, indicating the migration is still ongoing, the I/O HB logic continues buffering atomic operations that target memory page "X", assuming that the I/O HB has sufficient credits to assign to newly received atomic operations (block 620). Then, if I/O HB logic detects receipt of a second atomic operation while the first atomic operation is still buffered (block 622), the I/O HB control logic 215 returns the process to block 606 at which the I/O HB logic indentifies the memory page being targeted by the received second atomic operation before deciding how to buffer the second atomic operation (e.g., as a first type or a second type atomic operation).

Turning now to FIG. 7, which provides the use of the page table copy 211 (FIG. 4) to complete certain of the functions of the described embodiments. The method begins at block 702 which provides that the PHB control logic 215 copies the page table 210 into the PHB cache/storage. In one implementation, only the page table entries of relevance to the PHB are actually copied into a reduced-size page table copy. The PHB control logic checks the migration bits that are set within the page table copy and sets the AOS bits of each AO buffer in which an atomic operation is placed that targets a migrating page (block 704). A determination is made at block 706 whether a page table invalidation signal is received. When no invalidation signal is received, the PHB control logic 215 waits to receive an atomic operation. As determined at block 708, when an atomic operation is received, the atomic operation is buffered in the AO buffer (block 710). The appropriate value for the AOS bit of that AO buffer is then determined by reading the value of the migration bit within the page table copy and then performing portions of the process presented at block 704 for the specific table entry.

Returning to decision block 706, when a page invalidation signal is received, the PHB control logic copies a new page table from the system memory (block 712). The PHB control logic then checks the migration bits for the page entries that are mapped to the PHB (714) and performs the process of setting/resetting the corresponding AOS bits for those page entries whose migration bit values have changed since the previous copy of the page table was received. Thus, the PHB control logic sets the AO bits, if any, for AO buffers with atomic operations targeting the pages with page table entries that have their migration bit set. The PHB control logic also resets those AOS bits corresponding to the AO buffers of atomic operations that target pages whose page entries no longer have their migration bit set.

In one implementation, the firmware triggers the I/O host bridge to set the AOS bit to the pre-established value and record in a migration register the address range of the page being migrated. Then the firmware performs the process of determining which memory page(s) are being affected by the migration operation(s) by comparing the address against the address range within the migration register.

In the below described embodiment, both the system firmware 205 and I/O HB logic of the I/O HB control different aspects of the single process (versus all aspects being controlled by one or the other of the logic components as described by the above methods). The below described method is implemented within a data processing system having an input/output (I/O) subsystem including at least one I/O host bridge (HB) and a memory subsystem with a page table. Thus, firmware 205 within the data processing system detects the activation of a page migration operation, which migrates a memory page of data from a source memory location to a destination memory location. The firmware 205 sets, within the page table, a migration bit corresponding to the memory page that is being migrated. The migration bit is set to a pre-established value that indicates that there is an ongoing migration within the memory subsystem of the corresponding memory page. Then, the I/O host bridge detects receipt of an atomic operation. In response to detecting receipt of the atomic operation, the I/O host bridge identifies which memory page is being targeted by the atomic operation, and autonomously checks the value of the migration bit corresponding to the targeted memory page within the page table. When the migration bit is set to the pre-established value, the I/O host bridge prevents the atomic operation from being completed within the memory subsystem until the migration operation completes. When the page migration is completed and no other page migration is ongoing that involves the targeted page of the received atomic operation: the memory controller resets the value of the migration bit to a next value that indicates that the migration is complete. With the migration completed, the stalled atomic operations are no longer prevented from accessing the targeted memory pages within the memory subsystem. The I/O HB dispatches the stalled atomic operation to the memory page stored at the destination location of migration.

The method of identifying which memory page is being targeted by the atomic operation involves retrieving the address of a memory block that is targeted by the atomic operation. When the address of the memory block being targeted by the atomic operation is a memory addresses within a memory page(s) whose corresponding migration bit is set within the page table, the method automatically initiates the process for stalling the atomic operation and preventing the atomic operation from being completed until the migration of the memory page completes.

In one embodiment, the process by which the PHB resets the atomic operation stall bit involves: detecting completion of the page migration; automatically resetting the migration bit in the page table; the I/O HB logic detecting a reset of the migration bit; and the PHB logic resetting the atomic operation stall bit within the first buffer. The PHB logic detecting the reset of the migration bit comprises periodically checking the page table within the memory to determine if the migration bit has been reset. In an alternate implementation, the process by which the PHB logic detects the reset of the migration bit involves: caching a copy of the page table within a cache of the PHB; detecting an invalidation of the copy of the page table within the cache; responsive to receipt of the invalidation of the copy of the page table, automatically retrieving a current copy of the page table from the memory subsystem; checking the migration bit of each page entry that has a buffered atomic operation within the PHB buffers; and updating/resetting the atomic operation stall bits in each PHB buffer holding an atomic operation that targets a memory page whose migration bit has been reset in the current copy of the page table.

In one implementation, the atomic operation is a first atomic operation. Then, the process by which the I/O HB prevents the atomic operation from being initiated with the memory subsystem involves: placing the first atomic operation in a first buffer of the I/O host bridge; setting an atomic operation stall (AOS) bit associated with the first buffer, where the first atomic operation is prevented from completing when the AOS bit is set; resetting the AOS bit when the page migration is completed; and enabling the first atomic operation to complete when the atomic operation stall bit is not set in the first buffer.

In yet another embodiment, the atomic operation is a second atomic operation that targets a page that is not being migrated, and the method comprises: placing the second atomic operation in a second buffer of the I/O host bridge, which second buffer has an associated second atomic operation stall bit that is not set; and enabling the second atomic operation to complete on its targeted page when the second atomic operation stall bit is not set.

In one embodiment, the method enables out of order processing of received atomic operations, by stalling a first atomic operation from completing when the first received atomic operation targets a memory page that is being migrated by the page migration operation; and dispatching a subsequently received, second atomic operation for completion of the atomic operation within the memory subsystem, when the second page targeted by the second atomic operation is not being migrated. The second atomic operation is allowed to complete within the memory subsystem, while a previously-received first atomic operation is stalled pending completion of the migration operation affecting the memory page targeted by the first atomic operation.

Finally, in one embodiment the I/O host bridge comprises a PCIe host bridge (PHB) and the Atomic Operations are PCIe atomic operations; and the AOS bit is a predefined PCIe construct within a pre-established location within a register of the PHB. Also, when the data processing system comprises multiple I/O host bridges that are mapped to the memory page(s) associated with the page migration operation and which I/O host bridges include mappings to devices that generate atomic operations, automatically triggering the setting of the migration bit in each of the multiple I/O host bridges.

In one implementation, the functional features of the embodiments described herein are implemented within a processor. The processor is utilized within a data processing system having an I/O subsystem coupled to a system memory that stores data that are accessible as paged data, where the system memory includes a page table with each page entry of the page table having a migration bit that is set when a migration of a corresponding memory page is initiated and reset when the migration completes. The processor comprises at least the following components: a processor core; connectivity affordances to enable connection to the I/O subsystem and system memory do the data processing system; and logic components that enable completion of the functions of the I/O HB and/or certain firmware functions to enable implementation of either of the two primary embodiments and each alternate embodiment described herein.

With the capability to bypass pending/stalled operations supported by one or more of the embodiments presented herein, the different types of I/O operations typically handled by the PHB 120 are important for scheduling of operations. Some of these I/O operations may be scheduled out of scheduling order while others, such as the dependent atomic operations described herein, are not. PCIe atomic operations are referred to as non-posted operations within the PCI protocol, and the PCIe protocol defines which operations are allowed to bypass other (previously received) operations. The net result of these allowances is that DMA Write requests as well as DMA Reads are allowed to pass PCIe Atomic Operations. The above described embodiments expand upon this definition in the protocol and takes further advantage of that ability of DMA writes relative to atomic operations. As is illustrated by both FIGS. 2 and 4, the improved PHB 120 implements separate buffering for atomic operations from the DMA operations, and the PHB dispatch logic allows DMA operations to bypass stalled PCIe atomic operations, while following established PCIe ordering rules relative to other DMAs and to non-stalled atomic operations.

The final two functional blocks of FIG. 6 illustrates this bypass of stalled atomic operation(s) by subsequently/later received DMA transactions. Beginning at block 624, a determination is made whether a DMA operation is received at the PHB while the AOS bit is set. This determination follows the setting of the AOS bit (block 614) and the subsequent stalling of the received atomic operation (block 616). When a DMA operation is received while the AOS bit is still set, indicating that any received atomic operation has been stalled, the PHB dispatch/scheduling logic buffers the DMA for completion independent of the stalled atomic operation completion time (block 626).

Referring now to FIG. 8, which presents a logic flow diagram of the manner in which the PHB control logic handles receipt of certain I/O operations, namely DMA operations, atomic operations which target pages undergoing a migration and atomic operations that target pages that are not being migrated. At logical block 802, the PHB 120 receives an I/O operation/transaction while a page migration is ongoing in the system memory on a page that is mapped to the particular PHB. The PHB control logic 215 decodes the header of the I/O transaction and performs any required address translations and other operations (via mechanisms not shown herein or germane to the description of the embodiments) (block 804). With this information, PHB logic determines at block 806 the transaction type from among three presented transaction types. When the transaction is a DMA, the PHB runs the DMA state machine to service the DMA transaction (block 808). Then the DMA operations are buffered and performed while the page migration is ongoing (block 810), regardless of which other operations are pending in the PHB buffers. When the transaction type is a first type atomic operation (i.e., an atomic operation that targets a page of memory that is currently being migrated), then the PHB control logic 215 buffers/stalls the atomic operation and waits until the migration is completed before enabling the atomic operation to be dispatched for execution within the memory subsystem (block 812). However, when the atomic operation is a second type atomic operation (i.e., an atomic operation that is targeting a memory page that is not undergoing a migration), then the atomic operation is buffered for dispatch relative to the order of dispatch of atomic operations with DMA operations (block 814). The process then moves to decision block 816 where the PHB determines if another I/O transaction is received for similar processing and buffering/scheduling. When there are no other transactions to be processed, the process ends at block 818.

One embodiment defines the above operations as a method which performs the following functions: the I/O host bridge separately buffering the DMA operations from the Atomic operations; enabling the buffered DMA operations to proceed during the page migration; receiving a direct memory access (DMA) operation targeting the memory page being migrated; and allowing the DMA operation to bypass the pending/stalled Atomic Operation and complete the DMA operation on the memory page.

FIG. 9 illustrates the out-of order dispatch/scheduling or I/O transactions relative to the order of receipt by the PHB 120. Within the figure, the transactions are illustrated as circles and are assume to be completed in a serial manner to simplify the illustration (however, it is appreciated that some overlap in completion is permitted within the PCIe protocol). Below each sequence of transactions is a time line running from right to left, beginning at time T0, which represents the beginning of the page migration of memory page tagged as "PgAddrA". During the first time line 901, the transactions are received in the following sequence: DMA1, AO1, AO2, DMA2. The actual type of DMA operation is not relevant to this discussion and all references herein to DMA are left as a general DMA operation. Notably, AO1 targets page PgAddrA, which is the page that is being migrated. AO2 targets a different page than the one that is being migrated. The second/middle time line 903 illustrates the ordering sequence of the transactions by the PHB control logic when implementing the first embodiment that is illustrated by FIGS. 2 and 3 and described above. With this first embodiment, all atomic operations are stalled by use of a single AOS bit within the PHB (or memory). As a result, AO1 and AO2 are stalled and cannot complete until the page migration has completed, which occurs at some arbitrary later time, Tm. However, the DMA transactions complete as soon as they can be scheduled by the PHB, and are not affected by the presence of the AOS bit and/or the two stalled atomic operations.

The third/bottom time line 905 then presents the completion sequence for the transactions where the second embodiment, which is implemented as illustrated by FIGS. 4-7 is implemented. With this embodiment, only the atomic operation AO1 that targets a page that is currently being migrated is stalled, pending completion of the page migration. The other transactions, including the two DMAs and importantly, the second atomic operation AO2 are processed by the PHB logic as soon as the PHB logic is able to dispatch the respective operations to system memory.

The foregoing description has been presented for purposes of illustration and elaboration, and is not intended to be exhaustive or limited to the structures and processes disclosed. Many modifications and variations will be apparent to those of ordinary skill in the art. Various embodiments were chosen and described in order to best explain the principles of operation, the practical application, and to enable others of ordinary skill in the art to understand and apply the disclosed teachings in various embodiments with any modifications suitable for the particular use contemplated.

While the present invention has been particularly shown as described with reference to one or more preferred embodiments, it will be understood by those skilled in the art that various changes in form and detail may be made therein without departing from the spirit and scope of the invention. For example, while the present invention has been described in the context of a fully functioning data processing system, those of ordinary skill in the art will appreciate that the processes of the present invention are capable of being distributed in the form of a computer program product including a computer readable storage medium having program code stored therein. Examples of computer readable storage media include hard disk drives, RAM or other volatile memory, non-volatile memory, and optical storage media.

What is claimed is:

1. In a data processing system having an input/output (I/O) subsystem including at least one I/O host bridge and a memory subsystem with a page table, a method comprising:
firmware within the data processing system detecting an activation of a page migration operation to migrate a memory page of data from a source memory location within the memory subsystem to a destination memory location;
the firmware notifying each of the at least one I/O host bridge of the page migration operation;
in response to a start of the page migration operation, the at least one I/O host bridge setting an atomic operation stall (AOS) bit within the at least one I/O host bridge to a pre-established value that indicates that there is an ongoing migration operation within the memory subsystem of a memory page that is mapped to the at least one I/O host bridge, wherein when the AOS bit is set to the pre-established value, the at least one I/O host bridge prevents/stalls any received atomic operations for the entire memory subsystem from completing;
the at least one I/O host bridge detecting receipt of an atomic operation for scheduling;
in response to detecting receipt of the atomic operation:
the at least one I/O host bridge autonomously checking the value of the AOS bit; and
in response to the AOS bit being set to the pre-established value, preventing the atomic operation from being initiated within the memory subsystem.

2. The method of claim 1, further comprising:
in response to (a) the page migration being completed and (b) there not being any other ongoing page migration that involves the page mapped through the at least one I/O host bridge:
resetting the value of the AOS bit to a next value other than the pre-established value, wherein the atomic operation is dispatched for execution within the memory subsystem when a value of the AOS bit is not the pre-established value; and
dispatching the atomic operation to execute within the memory subsystem.

3. The method of claim 1, wherein the data processing system comprises multiple I/O host bridges that are mapped to the memory page(s) associated with the page migration operation and the multiple I/O host bridges include mappings to devices that generate atomic operations, the method further comprising:

the system firmware automatically notifying each of the multiple I/O host bridges and each respective I/O host bridges setting the AOS bit associated with each of the multiple I/O host bridges.

4. The method of claim 3, further comprising:
the system firmware automatically triggering the setting of the AOS bit associated with each of the multiple I/O host bridges.

5. The method of claim 1, wherein:
the at least one I/O host bridge is a Peripheral Component Interconnect (PCI) Express (PCIe) host bridge (PHB) and the atomic operations are PCIe atomic operations; and
the AOS bit is a predefined construct within a pre-established location within a migration register of the PHB.

6. The method of claim 1, wherein the at least one I/O host bridge is a Peripheral Component Interconnect (PCI) Express (PCIe) host bridge (PHB), the method further comprising:
receiving a direct memory access (DMA) operation targeting the memory page;
the PHB bypassing any received atomic operations that are prevented/stalled from completing and completing the DMA operation on the memory page ahead of the stalled atomic operations.

7. The method of claim 6, further comprising:
the at least one I/O host bridge separately buffering the DMA operation from the atomic operations; and
enabling the DMA operation to proceed during the page migration.

8. A data processing system, comprising:
a processor core;
a system memory coupled to the processor core and which stores data that are accessible as paged data;
system firmware executing on one or more components of the data processing system that:
detects activation of a page migration operation to migrate a memory page of data from a source memory location within a memory subsystem of the system memory to a destination memory location;
notifies one or more I/O host bridges that have a mapping to the page being migrated of the page migration operation;
tracks a completion status of the migration operation; and
indicates when the page migration operation has completed;
an input/output (I/O) subsystem communicatively coupled to the memory, the I/O subsystem including at least one I/O host bridge (HB) having logic that:
in response to receiving a notification of the page migration operation starting, sets an atomic operation stall (AOS) bit within the at least one I/O host bridge to a pre-established value that indicates that there is an ongoing migration operation within the memory subsystem of a memory page that is mapped to the at least one I/O host bridge, wherein when the AOS bit is set to the pre-established value, the at least one I/O host bridge prevents/stalls any received atomic operations for the entire memory subsystem from completing;
in response to detecting receipt of an atomic operation:
autonomously checks a current value of the AOS bit; and
in response to the AOS bit being set to the pre-established value, prevents the atomic operation from being initiated within the memory subsystem.

9. The data processing system of claim 8, wherein the I/O HB logic further comprises logic that:

in response to (a) the page migration operation being completed and (b) there not being any other ongoing page migration that involves the page mapped through the at least one I/O host bridge:
  resets the value of the AOS bit to a next value other than the pre-established value, wherein the atomic operation is dispatched for execution within the memory subsystem when a value of the AOS bit is not the pre-established value; and
  dispatches the atomic operation to execute within the memory subsystem.

10. The data processing system of claim 8, wherein the data processing system comprises multiple I/O host bridges that are mapped to the memory page(s) associated with the page migration operation and the multiple I/O host bridges include mappings to devices that generate atomic operations, the system firmware:
  automatically notifies each of the multiple I/O HBs, and each respective I/O HB logic of the multiple I/O HBs of the setting the AOS bit associated with each of the multiple I/O HBs; and
  automatically triggers setting of the AOS bit associated with each of the multiple I/O host bridges.

11. The data processing system of claim 8, wherein:
  the at least one I/O host bridge is a Peripheral Component Interconnect (PCI) Express (PCIe) host bridge (PHB) and the atomic operations are PCIe atomic operations; and
  the AOS bit is a predefined construct within a pre-established location within a migration register of the PHB.

12. The data processing system of claim 8, wherein the at least one I/O host bridge is a Peripheral Component Interconnect (PCI) Express (PCIe) host bridge (PHB), the wherein the I/O HB:
  receives a direct memory access (DMA) operation targeting the memory page;
  the PHB bypasses any received atomic operations that are prevented/stalled from completing and completes the DMA operation on the memory page ahead of the stalled atomic operations.

13. The data processing system of claim 12, wherein the I/O HB:
  separately buffers the DMA operation from the atomic operations; and
  enables the buffered DMA operation to proceed during the page migration.

14. A processor for a data processing system having a system memory subsystem supporting page data migration and an input/output (I/O) subsystem, the processor comprising:
  a processor core;
  at least one I/O host bridge that is coupled to the processor core and which includes a host bridge logic that:
    in response receiving a notification of a page migration operation, sets an atomic operation stall (AOS) bit within the at least one I/O host bridge to a pre-established value that indicates that there is an ongoing migration operation within the memory subsystem of a memory page that is mapped to the at least one I/O host bridge, wherein when the AOS bit is set to the pre-established value, the at least one I/O host bridge prevents/stalls any received atomic operations for the entire memory subsystem from completing;
    in response detecting receipt of an atomic operation:
      autonomously checks a current value of the AOS bit; and
      in response to the AOS bit being set to the pre-established value, prevents the atomic operation from being initiated within the memory subsystem.

15. The processor of claim 14, further comprising system firmware which:
  detects activation of a page migration operation to migrate a memory page of data from a source memory location within the memory subsystem to a destination memory location;
  notifies one or more I/O host bridges that have a mapping to the page being migration of the page migration operation;
  tracks a completion status of the migration operation; and
  indicates when the page migration operation has completed.

16. The processor of claim 14, wherein the I/O host bridge logic further:
  in response to (a) the page migration being completed and (b) there not being any other ongoing page migration that involves the page mapped through the at least one I/O host bridge:
    resets the value of the AOS bit to a next value other than the pre-established value, wherein the atomic operation is dispatched for execution within the memory subsystem when a value of the AOS bit is not the pre-established value; and
    dispatches the atomic operation to execute within the memory subsystem.

17. The processor of claim 14, wherein the processor comprises multiple I/O host bridges that are mapped to the memory page(s) associated with the page migration operation and the I/O host bridges include mappings to devices that generate atomic operations, and the system firmware further:
  automatically notifies each of the multiple I/O host bridges, and each respective I/O host bridge logic of the multiple I/O host bridges of the setting the AOS bit associated with each of the multiple I/O host bridges.

18. The processor of claim 14, wherein:
  the at least one I/O host bridge is a Peripheral Component Interconnect (PCI) Express (PCIe) host bridge (PHB) and the atomic operations are PCIe atomic operations; and
  the AOS bit is a predefined construct within a pre-established location within a migration register of the PHB.

19. The processor of claim 14, wherein the at least one I/O host bridge is a Peripheral Component Interconnect (PCI) Express (PCIe) host bridge (PHB), the I/O host bridge further:
  receives a direct memory access (DMA) operation targeting the memory page;
  the PHB bypasses any received atomic operations that are prevented/stalled from completing and completes the DMA operation on the memory page ahead of the stalled atomic operations.

20. The processor of claim 19, wherein the I/O host bridge further:
  separately buffers the DMA operation from the atomic operations; and
  enables the DMA operation to proceed during the page migration.

* * * * *